United States Patent Office 3,703,483
Patented Nov. 21, 1972

3,703,483
POLYMERIZATION PROCESS AND CATALYST SYSTEM THEREFOR
John E. Bozik, Pittsburgh, Harold E. Swift, Gibsonia, and Ching-Yong Wu, Pittsburgh, Pa., assignors to Goodrich-Gulf Chemicals Inc., Cleveland, Ohio
No Drawing. Original application Mar. 10, 1969, Ser. No. 812,536, now Patent No. 3,565,875, dated Feb. 23, 1971. Divided and this application July 9, 1970, Ser. No. 61,013
Int. Cl. C08g 23/14
U.S. Cl. 260—2 A
9 Claims

ABSTRACT OF THE DISCLOSURE

Process for polymerizing olefins, diolefins and alkylene oxides in the presence of a catalyst system comprised of an iron complex, a trialkyl aluminum compound and a bidentate ligand capable of both pi ($\pi$) and sigma ($\sigma$) bonding to form a five or six-membered ring.

CROSS REFERENCE TO RELATED APPLICATIONS

This is a division of our copending application Ser. No. 812,536, filed Mar. 10, 1969, now U.S. Pat. 3,565,875.

BACKGROUND OF THE INVENTION

This invention relates to the polymerization of certain olefins, diolefins and alkylene oxides. More specifically, this invention relates to the rapid, relatively low temperature polymerization of a wide variety of organic monomers in high yields employing a highly specific three component catalyst system.

Many catalyst systems heretofore employed have been limited in their applicability due to their inability to catalyze polymerization activity in a variety of different monomers. Instead, most catalyst systems are employed to aid in the polymerization of a highly specific and narrow class of monomers. The restricted applicability of such catalyst systems severely limits the flexibility and range of commercial plant operations.

Specifically, coordination catalysts are generally limited in their ability to polymerize either polar or non-polar monomers. Few, if any, coordination catalysts are known to polymerize both polar and non-polar monomers. In addition, although coordination catalysts generally consist of at least one metallic component, few, if any, of such catalysts have heretofore been employed to obtain high molecular weight polymer employing an iron compound as a metallic compound. Iron compounds, though stable, inexpensive and readily available have basically been relegated as catalyst components to oligomerization.

Accordingly, it is an object of the present invention to provide a catalyst system and polymerization process capable of polymerizing a wide variety of organic monomers.

It is another object to provide a coordination catalyst system and polymerization process capable of polymerizing both polar and non-polar monomers.

It is still another object to provide a coordination catalyst system employing an iron complex as one of the components thereof.

SUMMARY OF THE INVENTION

These, as well as other objects, are accomplished in accordance with the present invention which provides a process comprising polymerizing monomers selected from the group consisting of:

(a) Olefins having the formula:

$$H_2C=CR_1R_2$$

wherein $R_1$ can be a halogen or an alkyl group containing from 1 to 4 carbon atoms and $R_2$ can be a halogen or a cyano radical;
(b) Diolefins; and
(c) Alkylene oxides having the formula:

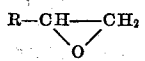

wherein R is hydrogen or an alkyl or aryl group containing from 1 to about 6 carbon atoms; in contact with a catalytically effective amount of a catalyst system comprising:
(i) An iron complex comprising a ligand containing oxygen donor atoms;
(ii) A trialkyl aluminum compound; and
(iii) A bidentate ligand capable of both pi and sigma bonding to form a five or six-membered chelate ring, characterized by the structural formula:

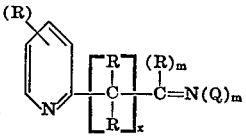

wherein m is a number from 0 to 1, x is a number from 0 to 1, y is a number from 0 to 4, R is a radical selected from the group consisting of hydrogen, alkyl, aryl, halogen, hydroxyl and acetoxy, and Q is a radical selected from the group consisting of hydrogen, alkyl, halogen, hydroxyl and acetoxy, the major portion of said sigma bonding being attributable to the ring nitrogen.

DESCRIPTION OF THE INVENTION

The catalyst system of the present invention is useful in polymerizing a wide variety of monomers both polar and non-polar. For example, monomers which are polymerizable in accordance with the present invention are exemplified by:

(a) Olefins having the formula:

$$H_2C=CR_1R_2$$

wherein $R_1$ can be a halogen such as chlorine, bromine, iodine and fluorine or an alkyl group containing from 1 to about 4 carbon atoms such as methyl, ethyl, n-propyl, iso-propyl, n-butyl, iso-butyl, tert.-butyl and the like, and $R_2$ can similarly be a halogen or a cyano radical. Illustrative of such olefins are vinylidene chloride, methacrylonitrile, vinylidene fluoride and the like;

(b) Diolefins especially the aliphatic acyclic conjugated diolefins containing from about 4 to about 12 carbon atoms such as butadiene, isoprene, piperylene, 2,3-dimethyl-butadiene, 1,3-pentadiene, chloroprene and the like; and (c) Alkylene oxides having the formula:

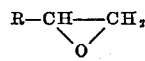

wherein R is an alkyl or aryl group containing from 1 to about 6 carbon atoms such as methyl, ethyl, propyl, butyl, phenyl and the like, or hydrogen. For example, ethylene oxide, propylene oxide, styrene oxide and the like have been found suitable.

In addition, the catalyst system of the present invention has been found useful in preparing copolymers on the various monomers set forth hereinabove. Surprisingly, although vinyl aromatics such as styrene were found to be inactive with the catalyst system of the present invention, they were found to copolymerize with the monomers set forth above.

Polymerization is obtained in accordance with the present invention by contacting at least one of the monomers described hereinabove with the three component catalyst system of the present invention in an inert diluent, if desired (although the use of such diluent is not considered necessary) at relatively low temperature, generally ranging from about −50° C. to about 150° C. The polymerization proceeds rapidly resulting in high yields of polymer.

The catalyst system is a three component system comprising:

(i) An iron complex comprising a ligand containing oxygen donor atoms such as, for example, iron (III) acetylacetonate, iron (III) naphthenate, iron octoate and the like;

(ii) A trialkyl aluminum preferably wherein the alkyl groups each contain from 1 to about 8 carbon atoms, for example, methyl, ethyl, n-propyl, isopropyl, n-butyl, sec-butyl, iso-butyl, hexyl, octyl and the like. Illustrative of such compounds are triethyl aluminum, tri-isopropyl aluminum, tri-isobutyl aluminum, tri-n-butyl aluminum, tri-octyl aluminum and the like; and (iii) A bidentate ligand capable of both pi and sigma bonding to form a five or six-membered chelate ring, said ligand being characterized by the structural formula:

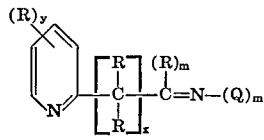

wherein R can be a radical such as hydrogen, alkyl preferably alkyls containing from 1 to about 8 carbon atoms such as methyl, ethyl, iso-propyl, tert.-butyl, hexyl, octyl and the like; aryl such as phenyl, benzyl and the like; halogen such as chlorine, bromine, iodine and fluorine; hydroxyl and acetoxy; Q can be a radical such as hydrogen, alkyl, preferably alkyls containing from 1 to about 8 carbon atoms such as methyl, ethyl, iso-propyl, tert.-butyl, hexyl, octyl and the like, halogen such as chlorine, bromine, iodine and fluorine; $m$ is a number from 0 to 1, $x$ is a number from 0 to 1 and $y$ is a number from 0 to 4.

Illustrative of the various ligands encompassed herein are the following examples which are not to be construed as imposing any limitation on the scope of the structural formula set forth hereinabove:

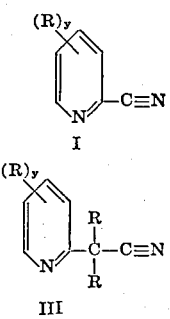

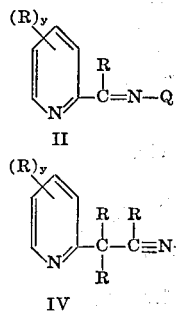

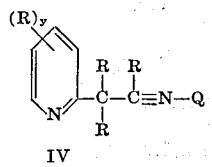

wherein R, Q and $y$ are as defined above. Examples of such bidentate ligands are 2-cyanopyridine, phenyl-2-pyridylacetonitrile, 2-cyano-6-methylpyridine, 2-pyridine-aldoxime and the like.

The three component catalyst system of the present invention is highly specific in that all three components must be present for the catalyst system to be active. In addition, it has been found that the requirements for each component are quite rigid. Many closely analogous materials for each catalyst component have proven inoperable or were found to result in extremely low yields of polymer or the formation of only dimers and trimers. For example, although iron acetylacetonate is a suitable iron complex, the following metal acetylacetonates $M(AA)_x$ have proven inoperable: $Ni(AA)_2$, $Co(AA)_2$, $Co(AA)_3$, $Cr(AA)_3$, $V(AA)_3$, $Mn(AA)_2$, $Zr(AA)_4$, $Ce(AA)_3$, $Cd(AA)_2$ and $Zn(AA)_2$.

In addition, although trialkyl aluminum compounds have proven suitable, other organometallic compounds have been found inoperable such as, for example, dialkyl halides, alkyl aluminum dihalides, phenyl magnesium chloride, di-sec-butyl magnesium and triethyl boron.

Still further, although many pyridine compounds and nitriles have proven to be suitable bidentate ligands, other closely analogous materials and even isomers have proven inoperable. For example, although 2-cyanopyridine is operable, 3-cyano- and 4-cyanopyridine have been found inoperable. Similarly, 2-aminomethyl pyridine, di-2-pyridyl ketone, 2-cyanoaniline, 2-acetyl pyridine, acetonitrile and 2-vinyl pyridine have been found inoperable.

It has been found in the present invention that in order to obtain an active polymerization catalyst, the ligand must be capable of coordinating with reduced iron in two positions, or functions as a bidentate ligand. With 3 and 4-cyanopyridine, chelate rings cannot form and use of these compounds results in inactive systems.

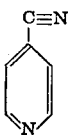 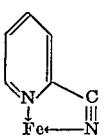 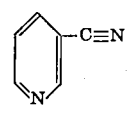

4-cyanopyridine inactive    3-cyanodyridine-iron complex-active    2-cyanopyridine inactive Although not wishing to be bound by any theory or mechanism, the relatively low activity of the $Fe(AA)_3$-TEA-2-cyano-6-methylpyridine system strongly suggests a steric hindrance effect. The steric hindraance could be a physical blocking or interference of the incoming monomer.

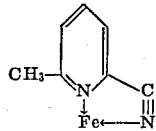

2-cyano-6-methylpyridine-iron complex-low activity

The fact that 2-aminomethyl pyridine forms an inactive polymerization catalyst complex illustrates that side chain unsaturation is essential. However, side chain unsaturation is not the only critical factor; there has to be a coordinating donor atom in the side chain, as shown, for example, by vinylpyridine not being an active promoter. The necessity of having the nitrogen donor atom in the aromatic ring is demonstrated by the inactivity of 2-cyano-aniline.

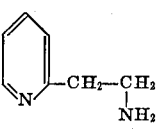 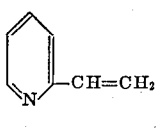 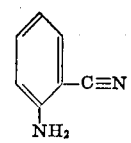

2-aminoethyl pyridine    vinylpyridine    2-cyanopyridine inactive

The specificity of the ligand makes this catalyst system analogous to enzymatic action. The ligand must have side chain unsaturation to participate in $d\pi$-$p\pi$ bonding with the iron orbitals and stabilize the reduced valence state of iron. But yet the ligand has to have a donor atom in the side chain and in the aromatic ring to participate in mainly sigma bonding. Thus, it appears to be necessary to have a critical balance of σ and π bonding in conjunction with stringent factors to have an active catalyst system.

Thus, it can readily be seen that the three component coordination catalyst of the present invention is highly specific with regard to the make-up of the three components.

The molar ratio of the trialkyl aluminum compound to the iron complex Al/Fe can be varied from about 1/1 to about 4/1; however, higher yields of polymer can be obtained at Al/Fe ratios of from about 2.5 to about 3.5 with optimum yields being secured at ratios of about 3. The molar ratio of the bidentate ligand to the iron complex, ligand/Fe, can be varied from about 0.1/1 to about 2.5/1 with best results being obtained within the range of about 0.5 to about 1.5. Small amounts of the catalyst system have been shown to be catalytically effective in the polymerization of the wide variety of monomers set forth hereinabove. For example, the molar ratio of monomer to iron complex, monomer/Fe, can vary from about 100/1 to about 400/1 without adverse effect on the rate of reaction or the efficiency of polymerization.

The polymerization reaction proceeds readily under normal conditions of temperature and pressure. The temperature can vary widely from about −50° C. to about 150° C.; preferably and most conveniently, however, the reaction proceeds at or about room temperature (25° C.). Although autogenous pressure developed during polymerization is generally sufficient, any pressure can be employed such as subatmospheric, atmospheric or superatmospheric. It is considered preferable that the reaction proceed under anhydrous conditions in an inert atmosphere such as under a blanket of nitrogen, argon, neon, and the like.

It is not considered necessary that an inert organic solvent or diluent be employed in the polymerization process; however, if desired, it has been found that the selection of the solvent is not critical and essentially any hydrocarbon solvent can be employed. The solvents can be aromatic, aliphatic or even halogenated hydrocarbons without adverse effect on the process. For example, solvents such as benzene, toluene, o-dichlorobenzene, n-hexane, heptane, 1,2-dichloroethane and the like have been found suitable. Preferably, aromatic hydrocarbon solvents are employed, such as benzene, toluene and the like, since these solvents have been found to provide a greater rate of polymerization.

Typically, the polymerization process proceeds in the following manner: to a dry 200 milliliter polymerization vessel is charged 0.1 millimole of iron acetylacetonate, 0.1 millimole of phenyl-2-pyridylacetonitrile, 40 milliliters of benzene, 20 milliliters (100 millimoles) of isoprene and 0.3 millimole of triethyl aluminum in that order. The particular order of addition is not considered critical and can be altered, if desired. All reactants are kept under a dry nitrogen atmosphere at all times. The polymerization vessel is then sealed and the reaction is allowed to proceed with agitation at room temperature until completion. Generally, high conversions of about 75 percent are easily obtained within a relatively short period of time. The resulting polyisoprene cement is then poured into alcohol such as methanol, ethanol, or the like to coagulate the polymer. The resulting polymer is then dried and recovered.

The following examples are cited to further illustrate various embodiments of the present invention and should not be construed as imposing any restriction or limitation upon the scope of spirit of the present invention.

EXAMPLE 1

A 2000 milliliter resin kettle equipped with a stirrer, nitrogen inlet and outlet, and a 250 milliliter addition flask was used as the reaction vessel. The kettle was thoroughly dried at 110° C. and allowed to cool to room temperature in a stream of dry nitrogen. The reactants were prepared in a nitrogen atmosphere in a glove box. To the resin kettle was added a solution of 4 millimoles of iron acetylacetonate, 4 millimoles of 2-cyanopyridine, 130 milliliters of benzene and 80 milliliters of isoprene. Thereafter, a solution of 12 millimoles of triethyl aluminum in 30 milliliters of benzene was added. A stream of nitrogen was kept flowing through the kettle at all times. When the reaction mixture became highly viscous, an additional 250 milliliters of benzene was added from the addition flask. The reaction was allowed to proceed for about 2 hours. The resulting polymer was then diluted with enough benzene to reduce the viscosity to a level where it would flow freely (about 500–1000 milliliters of benzene is generally sufficient for such purpose). Antioxidant was added to the solution. The dilute solution was then run into a methanol bath to coagulate the polymer. The recovered polymer was then dried in a vacuum oven. Infrared analysis established the polymer as being polyisoprene exhibiting the following microstructure: 50% cis-1,4, 3% trans-1,4 2% 1,2 and 45% 3,4.

EXAMPLE 2

Employing substantially the same procedure described in Example 1, several ligands were evaluated in lieu of 2-cyanopyridine in the three component catalyst system for the polymerization of isoprene. Table I summarizes the results obtained:

TABLE I

Effect of ligand on yield of polyisoprene

| Ligand: | Percent yield of polymer |
|---|---|
| 2-cyanopyridine | 60 |
| 3-cyanopyridine | 0 |
| 4-cyanopyridine | 0 |
| 2-cyano-6-methyl-pyridine | 18 |
| 2-pyridinealdoxime | 33 |
| Phenyl-2-pyridylacetonitrile | 75 |
| 1,2-bis-(2-pyridyl)-ethylene | 0 |
| 2,2'-dipyridyl | 0 |
| 2,2'-dipyridylamine | 0 |
| Acetonitrile | 0 |
| 2-cyanoaniline | 4 |
| Di-2-pyridyl ketone | 0 |
| 2-aminomethylpyridine | 0 |
| 2-acetylpyridine | 0 |
| 2-vinylpyridine | 0 |

EXAMPLE 3

Employing substantially the same procedure described in Example 1, several iron complexes were evaluated in lieu of the iron acetyl acetonate in the three component catalyst system for the polymerization of isoprene. Table II summarizes the results obtained:

TABLE II

Effect of iron complex on yield of polyisoprene

| Iron complex: | Percent yield of polymer |
|---|---|
| Iron acetylacetonate | 60 |
| Iron naphthanate | 60 |
| Iron octoate | 50 |
| Ferric chloride | 0.5 |
| Iron pentacarbonyl | 0 |
| Diiron nonacarbonyl | 0 |

EXAMPLE 4

Employing substantially the same procedure described in Example 1, several transition metal acetylacetonates were evaluated in lieu of the iron acetylacetonate in the three component catalyst for the polymerization of isoprene. Table III summarizes the results obtained:

TABLE III

Effect of transition metal acetylacetonates on yield of polyisoprene

| Metal acetylacetonate (M(AA)$_x$): | Percent yield of poylmer |
|---|---|
| Fe(AA)$_3$ | 60 |
| Ni(AA)$_2$ | 0 |
| Co(AA)$_2$ | 0 |
| Co(AA)$_3$ | 0 |
| Cr(AA)$_3$ | 0 |
| V(AA)$_3$ | 0 |
| Mn(AA)$_3$ | 0 |
| Mn(AA)$_2$ | 0 |
| Zr(AA)$_4$ | 0 |
| Ce(AA)$_3$ | 0 |
| Cd(AA)$_2$ | 0 |
| Zn(AA)$_2$ | 0 |

EXAMPLE 5

Employing substantially the same procedure described in Example 1, several organometallic reducing agents were evaluated in lieu of the triethyl aluminum in the three component catalyst for the polymerization of isoprene. Table IV summarizes the results obtained:

TABLE IV

Effect of organometallic reducing agents on yield of polyisoprene

| Organometallic compound: | Percent yield of polymer |
|---|---|
| Triethyl aluminum (TEA) | 60 |
| Tri-isobutyl aluminum | 60 |
| Tri-octyl aluminum | 60 |
| Diethyl aluminum chloride | 0 |
| Ethyl aluminum dichloride | 0 |
| Phenyl magnesium chloride | 0 |
| Di-sec-butyl magnesium | 0 |
| Triethyl boron | 0 |

EXAMPLE 6

Employing substantially the same procedure described in Example 1, a wide variety of olefinic, diolefinic and alkylene oxide monomers were polymerized. Table V summarizes the results obtained:

TABLE V

| Monomer | Conversion, percent | Time (hours) |
|---|---|---|
| Isoprene | 75 | 2 |
| Butadiene-1,3 | 75 | 2 |
| 2,3-dimethyl-butadiene-1,3 | 60 | 2 |
| Pentadiene-1,3 | 50 | 2 |
| Vinylidene chloride | 62 | 20 |
| Chloroprene | 7 | 4 |
| Methacrylonitrile | 15 | 20 |
| Propylene oxide | 10 | 24 |

EXAMPLE 7

Employing substantially the same procedure as set forth in Example 1, butadiene was polymerized at 0° C. in hexane solvent; a conversion of about 75 percent was achieved in about 2 hours. Infrared analysis indicated a polybutadiene exhibiting the following microstructure: 14% trans-1,4; 33% cis-1,4 and 53% 1,2.

EXAMPLE 8

Employing substantially the same procedure described in Example 1, a mixture of isoprene and styrene (50 mole percent styrene) was charged to the polymerization vessel. The recovered copolymer was found to contain 18.6 mole percent styrene.

The polymers obtained in accordance with the present invention range from elastomeric polymers to plastics and resins. These polymers are useful in adhesives, belts, films, fibers, tire manufacture, electrical insulation and other similar uses.

What is claimed is:

1. Polymerization process comprising polymerizing alkylene oxides having the formula:

$$R-CH-CH_2 \diagdown O \diagup$$

wherein R is hydrogen or an alkyl or aryl group containing from 1 to about 6 carbon atoms or mixtures thereof; in contact with a catalytically effective amount of a catalyst system comprising:

(i) an iron complex comprising a ligand containing oxygen donor atoms selected from the group consisting of iron (III) acetylacetonate, iron (III) naphthenate and iron octoate;
(ii) a trialkyl aluminum compound; and
(iii) a bidentate ligand capable of both pi and sigma bonding to form a five or six-membered chelate ring characterized by the structural formula:

$$(R)_y \diagdown \diagup \quad \begin{bmatrix} R' \\ C \\ R \end{bmatrix}_x (R)_m \\ \diagup N \diagdown \quad C=N-(Q)_m$$

where m is a number from 0 to 1, x is a number from 0 to 1, Y is a number from 0 to 4, R is a radical selected from the group consisting of hydrogen, alkyl containing 1 to 8 carbon atoms, phenyl or benzyl, halogen, and Q is a radical selected from the group consisting of hydrogen, alkyl containing 1 to 8 carbon atoms, halogen, the major portion of said sigma bonding being attributable to the ring nitrogen.

2. Polymerization process as defined in claim 1 wherein the molar ratio of trialkyl aluminum to iron complex varies from about 1/1 to about 4/1.

3. Polymerization process as defined in claim 1 wherein the molar ratio of bidentate ligand to iron complex varies from about 0.1/1 to about 2.5/1.

4. Polymerization process as defined in claim 1 wherein the molar ratio of monomer to iron complex varies from about 100/1 to about 400/1.

5. Polymerization process as defined in claim 1 wherein the polymerization is conducted at temperatures ranging from about −50° C. to about 150° C.

6. Polymerization process as defined in claim 1 wherein the polymerization is conducted in the presence of an inert organic solvent.

7. Polymerization process as defined in claim 6 wherein the solvent is an inert aromatic hydrocarbon solvent.

8. Polymerization process as defined in claim 1 comprising polymerizing at least one alkylene oxide having the formula:

$$R-CH-CH_2 \diagdown O \diagup$$

wherein R is hydrogen or an alkyl or aryl group containing from 1 to about 6 carbon atoms, in contact with a catalytically effective amount of a catalyst system comprising: (i) iron acetylacetonate, (ii) trialkyl aluminum, and (iii) 2-cyanopyridine.

9. Polymerization process as defined in claim 8 wherein phenyl-2-pyridylacetonitrile is employed in lieu of 2-cyanopyridine.

References Cited

UNITED STATES PATENTS

| 3,186,958 | 6/1965 | Kutner et al. | 260—2 |
| 3,396,125 | 8/1968 | Wofford et al. | 260—2 |
| 3,484,388 | 12/1969 | Wofford | 260—2 |
| 3,546,134 | 12/1970 | Wofford et al. | 252—431 |

WILLIAM H. SHORT, Primary Examiner

E. A. NIELSEN, Assistant Examiner

U.S. Cl. X.R.

252—431 N; 260—615 B

UNITED STATES PATENT OFFICE
CERTIFICATE OF CORRECTION

Patent No. 3,703,483      Dated November 21, 1972

Inventor(s) John E. Bozik et al.

It is certified that error appears in the above-identified patent and that said Letters Patent are hereby corrected as shown below:

Column 3, line 7, "on" should read -- of --. Column 4, line 18, after "dialkyl" insert -- aluminum --; line 71, "2-cyanopyridine inactive" should read -- 2-cyano-aniline --.

Signed and sealed this 20th day of November 1973.

(SEAL)
Attest:

EDWARD M. FLETCHER, JR.
Attesting Officer

RENE D. TEGTMEYER
Acting Commissioner of Patents